United States Patent Office 2,863,718
Patented Dec. 9, 1958

2,863,718

PLUTONIUM CONCENTRATION AND DECONTAMINATION METHOD

Donald C. Overholt, Putnam County, W. Va., and Frank W. Tober, Aiken, S. C., assignors to the United States of America as represented by the United States Atomic Energy Commission No Drawing. Application October 28, 1955
Serial No. 543,629

11 Claims. (Cl. 23—14.5)

Our invention relates to an improved process of separating plutonium from an aqueous mineral acid solution, and more particularly to an improved process of concentrating and decontaminating plutonium from an aqueous mineral acid solution of same together with uranium and fission products.

In utilizing uranium or plutonium as a fuel in neutronic reactors, the fuel would ideally be left in the reactor until substantially consumed by fission. In practice, however, fissionable material is withdrawn from a reactor for decontamination from fission products long before this. For example, uranium having the natural isotopic concentration may be withdrawn from a reactor after the uranium-235 concentration has been reduced from an initial 0.71% to only approximately 0.64%. This is done to prevent the accumulation of excessive quantities of fission products having high neutron absorption cross-sections. Extremely small amounts of such fission products have a highly deleterious effect on the reactivity of a reactor and may even damp the chain reaction. Furthermore, when a uranium-fueled reactor is employed to produce plutonium as a primary product, the plutonium must be removed before it is permitted to concentrate to a point at which it undergoes fission itself at an uneconomically rapid rate relative to the production thereof. The fissionable material remaining in a spent reactor fuel element is, therefore, a significant and valuable quantity, and since it may be reused as a reactor fuel, reactor design permitting, or, in the case of uranium, further concentrated by such isotopic separation means as gaseous diffusion, the recovery and decontamination of such fuel is of supreme importance in the economical development of an atomic energy program.

The processing of reactor fuel differs from most chemical processing principally in that minor quantities of fission products must be separated from large quantities of substantially unchanged material. The chemical processing associated with the operation of nuclear reactors, therefore, generally has three primary objectives: the removal of fission product poisons from the remaining fuel element; the reclamation of the fuel; and, in the case of an uranium-fueled, plutonium-producing reactor, the recovery of plutonium.

Widely employed methods for reactor fuel recovery involve solvent extraction separation. Briefly, these proceed along lines of simultaneous extraction of uranium and plutonium from an aqueous mineral acid solution with a particular organic solvent leaving the fission products behind, followed by separation of the plutonium and uranium thus extracted by preferential stripping of one and then the other from the organic extract. For further information concerning solvent extraction recovery processes, attention is invited to Nucleonics, March 1955, pages 18–21, and to the co-pending applications of the common assignee, S. N. 303,691, filed August 11, 1952, in the names of T. C. Runion, W. B. Lanham, Jr., and C. V. Ellison, entitled "Process for Separation of Plutonium, Uranium, and Fission Product Values" and S. N. 318,072, filed October 31, 1952, in the names of G. T. Seaborg, W. J. Blaedel, and M. T. Walling, Jr., entitled "Solvent Extraction Process."

Solvent extraction processing commonly achieves plutonium product recovery in the order of 96%–98% and decontamination factors (i. e., initial radioactivity count divided by final count) from fission products in the order of approximately $10^6$. However, decontamination is not total, and this might be objectionable for applications where high purity material is required. Furthermore, and most seriously, high concentration of the plutonium is not generally achieved. For example, plutonium product streams from solvent extraction processes usually contain only about one gram of plutonium per liter and frequently possess much smaller plutonium concentrations.

Several methods have been employed for plutonium concentration and further purification from relatively dilute solutions. A well known evaporation technique is partially successful, but it results in an undesirable accumulation of corrosion products in the plutonium. Also, it is hazardous due to possible explosion of entrained organic solvents. A solvent extraction process has been tested, but it is mechanically inoperable. Precipitation methods, such as those employing bismuth phosphate carrier, are tedious and time-consuming and involve relatively high product losses due to appreciable solubilities.

An object of our present invention, therefore, is to provide an improved process of concentrating and purifying plutonium from an aqueous mineral acid solution.

Another object is to provide a process of concentrating and purifying plutonium from an aqueous mineral acid solution containing same, in dilute concentration, together with the products of nuclear fission.

Another object is to provide a process of separating plutonium and uranium from an aqueous mineral acid solution containing same and fission products.

Yet another object is to provide such a process that is sufficiently versatile to handle plutonium product solutions from various solvent extraction processes containing varying amounts of plutonium, uranium and nuclear fission products.

Other objects and advantages of our invention will become apparent to those skilled in the art from the following detailed description and the claims appended hereto.

The present invention provides a process for concentrating and decontaminating plutonium from an aqueous mineral acid solution containing same, together with extraneous impurities, which comprises adjusting said solution to fractional-normal-mineral acid concentration and said plutonium to $Pu^{+3}$ oxidation state, contacting the resulting adjusted solution with a comminuted bed of a cation exchanger, and thereafter eluting the resulting adsorbed plutonium, while maintaining said plutonium in $Pu^{+3}$ oxidation state, with an aqueous nitric acid solution of a concentration at least at great as approximately 4 molar nitric acid.

The practice of our invention achieves excellent concentration of plutonium and further improves decontamination from fission products. For example, plutonium may be concentrated from an aqueous nitric acid solution containing about 0.2 grams plutonium per liter, in a single adsorption-elution operation, to a concentration of about 40–50 grams plutonium per liter, a concentration increase of about 200–250 times. Decontamination factors of at least one order of magnitude are regularly obtained, as well as substantial decontamination from ionic (i. e., non-radioactive) contaminants. This is all achieved in several relatively simple and quickly performed operations, with plutonium product streams from different solvent extraction processes of varying plutonium, uranium and fission product concentrations.

We attribute the success of our invention in considerable degree to the unexpected benefits flowing from the rigorous maintenance of plutonium in the $Pu^{+3}$ oxidation state, during both adsorption and elution operations. It has previously been considered, in methods employing ion exchange adsorption-elution for decontaminating plutonium, to be greatly preferred and highly advantageous that the plutonium be present in $Pu^{+4}$ oxidation state, both during adsorption and elution. An expression of this viewpoint is found in the co-pending application of the common assignee, which otherwise represents a significant advance over prior knowledge, S. N. 60,942, filed November 19, 1948, in the names of G. E. Boyd, M. D. Taylor, and E. R. Russell, entitled "Adsorption Process for Plutonium Separation," pages 8–9. Furthermore, the employment of fractional-normal (i. e., less than one normal) mineral acid feed solution and a considerably stronger nitric acid eluant, at least strong as approximately 4 molar nitric acid, contribute very greatly to the successful operation of our invention. Additionally, when sufficient uranium is present in the feed solution to warrant separate recovery, that is, in concentration at least approximately 1% of the plutonium, such uranium may be successfully adsorbed on the resin along with the plutonium, and separately eluted with a selective eluant prior to the plutonium elution, without adversely affecting plutonium recovery or concentration.

The mineral acid (preferably nitric acid since most solvent extraction processes are conducted in nitrate systems) concentration of the initial feed solution may vary while yet achieving reasonable plutonium recovery. We find, nonetheless, that immensely better results may be obtained with employing fractional-normal concentrations of nitric acid. Within this range, an aqueous feed solution approximately 0.15–0.5 normal in nitric acid is most suitable, approximately 0.3 normal nitric acid being preferred.

The rigorous maintenance of the plutonium in the $Pu^{+3}$ oxidation state, both during adsorption and elution, is critical to the success of our method. Among the notable advantages flowing from this procedure are: polymerization of plutonium is avoided, thereby permitting greater adsorption on the resin; about 25% less resin capacity is required; much less plutonium is lost in any uranium elution step; ionic impurities are concomitantly reduced, decreasing their affinity for the resin, in contrast to increasing plutonium affinity, thus improving decontamination from such impurities; and, most important, plutonium as $Pu^{+3}$ is subsequently eluted more readily than $Pu^{+4}$, and a higher concentration of plutonium is therefore obtained.

A variety of reducing agents, both organic and inorganic, may be employed for reducing plutonium to $Pu^{+3}$ oxidation state, and the employment of a particular one is not highly critical. Nonetheless, we find that hydrazine, ferrous sulfamate, sulfamic acid and various relatively low molecular weight organic aliphatic ketones and aldehydes, such as formaldehyde, are particularly suitable, while hydroxylamine sulfate $(NH_2OH.1/2H_2SO_4)$ is greatly preferred. The concentration of the reductant will vary, of course, with the amount of plutonium in the feed solution, which normally is approximately 0.2–5 grams plutonium per liter. Generally, the feed solution should be made at least approximately 0.03 molar in hydroxylamine; about 0.1 molar is optimum, and it would seldom be necessary to exceed a concentration of about 0.5 molar. The reduction reaction occurs almost immediately.

Upon the acidity adjustment and the addition of the reductant to the solution, the resulting solution may then be contacted with a cation exchanger. A wide variety of solid, comminuted, acid-insoluble cation exchangers may be satisfactorily utilized in our invention. Included are inorganic materials, such as acid-insoluble, naturally occurring zeolites and glauconites and acid-insoluble synthetic gels prepared from sodium silicate and aluminum salts having the general formula $$Na_2O.Al_2O_3.nSiO_2.XH_2O$$

in which $n$ has usually a value of 5 to 6. Also, advantageous results may be obtained with sulfonated carbonaceous exchangers (U. S. Patent 2,171,408 to P. Smit) and with relatively inert, synthetic organic resins, such as those having —COOH and —OH as the active cation groups. Particularly satisfactory, however, are synthetic organic aromatic hydrocarbon polymers containing nuclear sulfonic acid groups, that is, resins which contain numerous —$SO_3R$ groups, in which R is hydrogen or a metal cation, the acid form of the resin being preferred. Resins of this type which may be employed are sulfonated phenol-formaldehyde resins, sulfonated polystyrene resins being preferred due to their large exchange capacity, resistance to physical breakdown under nuclear irradiation and chemical stability to eluants. In the absorption process the hydrogen or metal cation of the sulfonic acid group is replaced by a cation of substance to be adsorbed, which thereupon forms a more or less loosely associated molecule with the resin. Among the specific nuclear sulfonated aromatic hydrocarbon polymers which may be very satisfactorily employed in our invention are those described in U. S. Patent 2,366,007 to G. F. D'Alelio and in U. S. Patent 2,204,539 to H. Wassenegger and K. Jaeger. For reasons of ready availability, reference is made to the following excellent trade-named sulfonated resins: Dowex–30, Rohm and Haas IR–100, and IR–120, Ionics CR–51 and Dowex–50 (a cross-linked sulfonated poly-vinyl benzene polymer, which is the single preferred resin for use in our invention).

The above resins may be satisfactorily employed in a wide variety of particle sizes. The use of smaller resin particles results in more rapid attainment of equilibrium during adsorption and in sharper bands during elution, thereby permitting faster flow rate. However, extremely small resin particles produce a high resistance to liquid flow and a compromise must be made between resin size and the hydrostatic head needed to maintain an efficient, economic flow rate. A satisfactory compromise between hydraulic and diffusion efficiencies may be obtained with the employment of a resin of mesh size of approximately 50–200, while a mesh size of approximately 60–100 is preferred.

Our process is sufficiently versatile to permit widely varying flow rates for the feed solution in the adsorption step, while yet achieving effective recovery and decontamination of plutonium. It is, of course, desirable to use as fast a flow rate as possible without disturbing the resin bed or affecting the degree of adsorption. Thus a flow rate of at least approximately 5 milliliters per minute per square centimeter of resin cross section area is satisfactory, while a flow rate of approximately 15 ml./min./cm.² is preferred.

After the adsorption the resin bed may be washed with a displacement volume of an aqueous solution of nitric acid and hydroxylamine, say approximately 0.1–0.25 molar nitric acid and approximately 0.05 molar hydroxylamine, in order to wash any occluded feed solution from the resin bed. Following this, the plutonium may be eluted with an aqueous mineral acid solution, the most suitable solution being an aqueous nitric acid solution. In order for the plutonium to be eluted in a reasonable length of time in sufficiently high concentration, the nitric acid concentration of the eluant must be at least as great as approximately 4 molar, while approximately 6 molar nitric acid is preferred. Nitric acid in this concentration range, and as low as approximately 2 normal, however, oxidizes $Pu^{+3}$ to $Pu^{+4}$, which lowers the plutonium concentration in the product, and nitrogen oxides are formed in the oxidation which rupture the bed and cause channeling of the acid. Other gassing effects may be caused by reaction between nitric acid and hydroxylamine adsorbed on the resin and between nitric acid and ionic impurities, principally ferrous iron from the stainless steel equipment generally employed in solvent extraction plants. We find, though, that the advantage of potentially high concentration factors obtainable with the above concentrations of nitric acid may be retained, without accompanying deleterious action, by the inclusion of a "holding reductant" in the eluant. Of the reductants previously referred to for inclusion in the feed solution, which are all satisfactory in dilute nitric acid solutions, we prefer to employ sulfamic acid as the holding reductant in the more concentrated nitric acid eluant solutions. Although the sulfamic acid concentration in the eluant may satisfactorily vary, generally suitable are fractional molar concentrations, a concentration of about 0.3 molar being preferred. The sulfamic acid, apparently, breaks the oxidation chain by reacting with nitrogen oxides as rapidly as they are formed.

The primary factor governing the elution operation is the adjustment of the elution rate so as to obtain as high as possible plutonium concentration in the eluate. To accomplish this, we have determined that the elution rate should be considerably lower than the feed adsorption rate. Thus, an elution rate up to approximately 2.0 ml./min./cm.$^2$ is satisfactory, while about 0.2 ml./min./cm.$^2$ is preferred. Increasing the elution rate beyond this range rapidly dilutes the plutonium concentration of the eluate. We have further noted that the plutonium concentration of the eluate rapidly reaches a peak of about 130 grams per liter relatively early during the elution, and that the concentration gradient decreases with the passage of additional eluant through the bed. With a passage of only about 2.5 volume changes (i. e., an eluant volume equivalent to the volume of liquid in the voids of the resin bed, which is about 50% of bulk resin volume with the given resin particle sizes) of eluant through the bed, about 90% of the adsorbed plutonium may be eluted in a concentration of about 40–50 grams per liter, as compared with a plutonium concentration in a feed solution as low as about 0.2 grams per liter and seldom greater than about 5 grams per liter. (Higher concentrations of plutonium in the feed may be expected to reduce the concentration factors attainable.) Since removing the remaining 10% of the adsorbed plutonium from the resin bed with the greater volumes that would be required would tend to diminish the plutonium concentration of the product, we find it advisable to retain the plutonium as a "heel" on the column for the next run. When the resin bed is employed in column form, the plutonium tends to adsorb onto the resin relatively close to the top of the column. In such circumstances, it is recommended that the plutonium be eluted in an "upflow" direction, that is, withdrawn through the top of the column in a direction opposite to that of the feed solution, rather than through the bottom, thereby further reducing the amount of eluant needed and increasing the plutonium concentration of the product.

Following the product elution, and particularly if an elapse of time is expected before the next run, it would be prudent to pass through the bed a dilute nitric acid-hydroxylamine sulfate solution of the same concentration as the feed solution in order to prevent any remaining strong nitric acid eluant from reacting with the resin. A further benefit of this treatment is the removal of gases formed by the action of particle emissions from the remaining radioactive material, particularly on water. This reconditioning solution, perhaps containing tiny amounts of eluted plutonium, may be collected for recycle with the feed solution in the next run.

In the event that the feed solution contains uranium of concentration greater than about 1% of the plutonium, due to some irregularity in prior solvent extraction processing, or if the plutonium solution is obtained from other sources, an uranium elution operation may be interpolated between the plutonium adsorption and elution steps. Various eluants are available for the uranium elution, including dilute aqueous solutions of such mineral acids as nitric, hydrochloric and hydrofluoric acids, and aqueous solutions of carboxylic acids such as citric and acetic acid. We prefer to employ, however, dilute aqueous sulfuric acid, generally in fractional-molar concentrations, approximately 0.25 molar sulfuric acid being quite satisfactory. The eluant should also contain a reductant, such as hydroxylamine sulfate, in fractional molar concentration, say about 0.05 molar, in order to maintain the plutonium on the resin as $Pu^{+3}$. The reductant is essential, for $Pu^{+4}$ would be complexed by sulfate, as is uranium, and pass off the column. $Pu^{+3}$ moves down the column only about 10% of its length during the uranium removal. The volume of eluant needed to remove a given amount of uranium depends partly on the amount of plutonium present, since the plutonium band determines the starting position of the uranium band (below the plutonium band) during chromatographic elution. The uranium may be completely desorbed, but partial elution of the uranium is also sufficient, since in the plutonium elution step, which is preferably upflow in contrast to a downflow uranium elution, the plutonium band moves up the column faster than the uranium band and is removed before the bulk of the uranium reaches the top of the column. The flow rate for the uranium eluant, while not critical, may suitably vary up to approximately 5 ml./min./cm.$^2$, about 2 ml./min./cm.$^2$ being preferred. Washing the bed after the uranium elution with a dilute solution of aqueous nitric acid and hydroxylamine sulfate, say 0.1 normal nitric acid and 0.05 molar hydroxylamine sulfate, particularly as iced solution (5°–10° C.), further minimizes gassing effects and maintains the plutonium in a $Pu^{+3}$ oxidation state. Similarly, an iced uranium eluant assists in this problem.

After a number of adsorption and elution cycles, fission products which have accumulated on the resin, chiefly zirconium, niobium, and rare earths, should be removed to minimize excessive radiation damage to the resin and to avoid the use of shielding for personnel protection. First, the plutonium heel from the last run is completely eluted. The column is then washed with 0.5 molar oxalic acid, which reduces the contamination by a factor of 10. This decontamination factor is considered sufficient to prevent serious radiation hazards, but, if any activities remaining on the resin are considered objectionable, they can be removed with 2 molar ammonium citrate at approximately pH 5.6. The cleaning action of either solution is improved by allowing it to stand in a column for a few hours, probably because polymerized forms are solubilized.

In a preferred form of our invention, an aqueous nitric acid solution of plutonium, in a concentration substantially less than 40 grams plutonium per liter and commonly between approximately 0.2–5 grams per liter, together with uranium and fission products, is adjusted to a concentration of about 0.3 molar nitric acid and 0.1 molar hydroxylamine sulfate. The resulting solution is passed, downflow, at a flow rate of about 15 ml./min./cm.$^2$ through a comminuted bed of an organic cation exchange resin characterized by a plurality of nuclear sulfonic acid groups, approximate mesh size 50–100. After the adsorption, the column is washed with 0.1–0.25 molar nitric acid containing about 0.05 molar hydroxylamine sulfate in order to wash all feed solution out of the resin bed. In the event that uranium in a concentration greater than 1% of the plutonium is present on the column, the uranium is eluted with an aqueous solution of approximately 0.25 molar sulfuric acid and 0.05 molar hydroxylamine sulfate at a flow rate of about 2 ml./min./cm.$^2$ in a downflow direction. After this, the plutonium is eluted upflow at a rate of 0.2 ml./min./cm.$^2$ with approximately 6 molar nitric acid stabilized with about 0.3 molar sulfamic acid, until approximately 90% of the plutonium is recovered from the resin. Following this, the bed is reconditioned for the next run with a reconditioning solution comprising 0.1 molar nitric acid containing 0.1 molar sulfamic acid. The displacement and reconditioning eluates may be collected for recycle to the next adsorption run.

The plutonium nitrate product may be converted to high quality elemental plutonium by precipitating the plutonium as plutonium peroxide, and hydrofluorinating the peroxide to form plutonium tetrafluoride, which may be reduced to the metal with an alkaline earth metal at an elevated temperature. The plutonium nitrate product can be handled without difficulty and the peroxide prepared from it is particularly satisfactory in yield and in bulk density.

The following examples are offered to illustrate our invention, particularly its quantitative and detailed aspects, in more detail.

EXAMPLE 1

An aqueous nitric acid product solution of plutonium from a solvent extraction process for the separation and decontamination of plutonium and uranium from neutron-irradiated uranium was adjusted to 0.1 M $HNO_3$ and 0.05 M hydroxylamine sulfate. The composition of this feed solution is shown in Table I, below.

*Table I*

COMPOSITION OF FEED SOLUTION

| Component | Concentration | Radioactivity (Counts/min./ml.) |
|---|---|---|
| Pu | 0.81 g./liter | |
| Total Pu | 80.4 g. | |
| U | 0.0026 g./liter | |
| Gross α | | $5.77 \times 10^7$. |
| Gross β | | $3.08 \times 10^4$. |
| Ru | | $4.81 \times 10^3$. |
| Zr | | $5.56 \times 10^2$. |
| Nb | | $1.54 \times 10^2$. |
| Total Rare Earths | | $2.69 \times 10^2$. |
| $UX_1 + UX_2$ (Th-234+Pa-234) | | $1.94 \times 10^4$. |
| Gross γ | | 4.4 mv./ml. |
| Total Volume | 165.4 liters | |

The adjusted feed solution was passed through a column of 50–100 mesh Dowex–50 cation exchange resin, 30.5 cm. height by 7.6 cm. diameter, at a flow rate of about 2.3 ml./min./cm.$^2$. About 16 mg. Pu, or 0.02% of the total adsorbed, was lost in the adsorption step. The column was washed with 0.1 M $HNO_3$ containing 0.05 M hydroxylamine sulfate as a displacement solution. Uranium was eluted, downflow, with an aqueous solution of 0.25 M $H_2SO_4$ and 0.05 M hydroxylamine sulfate at a flow rate of 1.8 ml./min./cm.$^2$. The plutonium was then eluted, upflow, with 6 M $HNO_3$ containing 0.3 M sulfamic acid at a flow rate of 0.55–1.1 ml./min./cm.$^2$ to achieve a 90% plutonium recovery. After the product recovery, the bed was reconditioned with an aqueous solution of 0.3 M $HNO_3$ and 0.05 M hydroxylamine and the reconditioning and displacement eluates collected for recycle to the next run. The composition of the product eluate and the excellent decontamination factors and product concentration factor obtained are shown in Table II.

*Table II*

RESULTS OF RUN

| Component | Concentration | Radioactivity (counts/min./ml.) | Decontamination Factor |
|---|---|---|---|
| Pu | 11.5 g./liter | | |
| Total Pu | 74.45 g. | | |
| U | 0.02 g./liter | | |
| Gross β | | $6.2 \times 10^4$ | 7.0 |
| Ru | | $5.0 \times 10^3$ | 11 |
| Zr | | $1.19 \times 10^3$ | 6.7 |
| Nb | | not evaluated | |
| $UX_1 + UX_2$ | | $5.4 \times 10^4$ | 4.5 |
| Gross γ | | 16.0 mv./ml. | 3.9 |
| Total Volume | 6.47 liters | | |
| Volume Reduction of Product. | 13.2 | | |

EXAMPLE 2

An aqueous nitric acid feed solution of plutonium from an uranium-plutonium solvent extraction process was adjusted to 0.15 N $HNO_3$ and 0.05 M hydroxylamine sulfate. The composition of the feed solution is shown in Table III, below.

*Table III*

COMPOSITION OF FEED SOLUTION

| Component | Concentration | Radioactivity (counts/min./mg./Pu) |
|---|---|---|
| Pu | 2.84 g./liter | |
| Total Pu | 67.6 g. | |
| Ru | | 5,170. |
| Zr | | 661. |
| Nb | | 90. |
| Total Rare Earths | | 34. |
| $UX_1 + UX_2$ | | 24. |
| Gross γ | | 23.8 mv./mg. Pu. |

This solution was passed through a column of Dowex-50 cation exchange resin, 50–100 mesh, 3 inch diameter, 14 inch length, at a flow rate of 6.6 ml./min./cm.$^2$ with a plutonium loss of only $3.7 \times 10^{-3}$% of that in the feed. The column was washed with a feed displacement volume of an aqueous solution 0.1 N in $HNO_3$ and 0.05 M in hydroxylamine sulfate. The adsorbed uranium was eluted from the column with 20 liters (representing 25 volume changes) of an aqueous solution of 0.25 M $H_2SO_4$ plus 0.05 M $NH_2OH \cdot \frac{1}{2} H_2SO_4$ at a downflow flow rate of 2 ml./min.cm.$^2$. The plutonium loss during the uranium elution was only $6.5 \times 10^{-4}$% of that on the column. After the uranium elution the column was washed with an iced solution of 0.1 N $HNO_3$ and 0.1 M hydroxylamine sulfate.

The plutonium was then eluted, upflow, with 4.35 M $HNO_3$ stabilized with 0.3 M $NH_2SO_3H$ at a flow rate of 0.2 ml./min./cm.$^2$ and the resin reconditioned with 0.1 M $HNO_3$–0.1 M $NH_2SO_3H$. The displacement and reconditioning eluates were collected for recycle in the next run.

Table IV, below, shows the results of the run.

*Table IV*

RESULTS OF RUN

| Component | Concentration | Radioactivity (counts/min./mg. Pu) | Decontamination Factor |
|---|---|---|---|
| Pu | 41.18 g./liter | | |
| Total Pu | 50.08 g. | | |
| Ru | | 2,160 | 2.4 |
| Zr | | 2.8 | 236 |
| Nb | | 3.6 | 32 |
| Total Rare Earths | | 63 | 0.5 |
| $UX_1 + UX_2$ | | .15 | 1.6 |

Thus, it may be seen, that in addition to improved decontamination, the plutonium product was concentrated from 2.84 g./liter to 41.18 g./liter. Additionally, the concentration of ionic impurities such as Fe, Ni, Cr, Al, Pb, Cu, Mg and Mn was reduced several times.

The above examples are merely illustrative and should not be construed as limiting the scope of our invention. It should be apparent that minor changes could be made in operating conditions without departing from the scope of our invention. Therefore, our invention should be limited only as is indicated by the appended claims.

Having thus described our invention, we claim:

1. A process for concentrating and decontaminating plutonium from an aqueous mineral acid solution containing same in small concentration, together with extraneous impurities, which comprises adjusting said solution to a fractional-normal mineral acid concentration and said plutonium to $Pu^{+3}$ oxidation state, contacting the resulting adjusted solution with a comminuted bed of a cation exchanger, and thereafter eluting the resulting adsorbed plutonium, while maintaining said plutonium in $Pu^{+3}$ oxidation state, with an aqueous nitric acid solution of a concentration at least as great as approximately 4 molar nitric acid.

2. A process for concentrating and decontaminating plutonium from an aqueous nitric acid solution containing same in small concentration, together with uranium and fission products, which comprises adjusting said solution to fractional-normal nitric acid concentration and said plutonium to $Pu^{+3}$ oxidation state, contacting the resulting adjusted feed solution with a comminuted bed of an organic cation exchange resin, and thereafter eluting the resulting adsorbed plutonium, while maintaining said plutonium in $Pu^{+3}$ oxidation state, with an aqueous nitric acid solution of a concentration at least as great as approximately 4 molar nitric acid.

3. The process of claim 2, wherein said plutonium is adjusted to, and maintained in, $Pu^{+3}$ oxidation state with a reductant selected from the group consisting of hydrazine, ferrous sulfamate, sulfamic acid, hydroxylamine sulfate and relatively low molecular weight organic aliphatic ketones and aldehydes.

4. The method of claim 3, wherein said plutonium is adjusted to $Pu^{+3}$ oxidation state with dissolved fractional molar hydroxylamine sulfate in said feed solution, and is maintained therein with dissolved fractional molar sulfamic acid in the nitric acid eluant.

5. The process of claim 2, wherein said fractional-normal aqueous nitric acid solution approximates 0.15 to 0.5 normal in nitric acid and 0.05 to 0.2 molar in hydroxylamine sulfate and wherein said aqueous nitric acid eluant approximates 4 to 6 normal in nitric acid and 0.3 molar in sulfamic acid.

6. A process for separating and concentrating plutonium from an aqueous nitric acid solution containing same in small concentration, together with uranium and fission products, which comprises adjusting said solution to fractional-normal nitric acid concentration and said plutonium to $Pu^{+3}$ oxidation state, contacting the resulting adjusted solution with a bed of a comminuted organic cation exchange resin characterized by a plurality of nuclear sulfonic acid groups, thereupon, while maintaining said plutonium in $Pu^{+3}$ oxidation state, selectively eluting the resulting adsorbed uranium from said bed with an aqueous fractional molar sulfuric acid solution, and thereafter, while still maintaining said plutonium in said $Pu^{+3}$ oxidation state, eluting the same with an aqueous nitric acid solution of a concentration at least as great as approximately 4 molar nitric acid.

7. A process for separating and concentrating plutonium from an aqueous nitric acid solution containing same together with uranium and fission products, which comprises adjusting said solution to a fractional-normal nitric acid concentration and said plutonium to the $Pu^{+3}$ oxidation state with dissolved fractional molar hydroxylamine sulfate, passing the resulting adjusted feed solution through a comminuted bed of an organic cation exchange resin, eluting the resulting adsorbed uranium, while maintaining the resulting adsorbed plutonium in $Pu^{+3}$ oxidation state, with an aqueous solution of fractional molar sulfuric acid and fractional molar hydroxylamine sulfate, and then eluting said plutonium with an aqueous nitric acid solution of a concentration at least as great as approximately 4 molar in nitric acid and fractional molar in sulfamic acid.

8. The method of claim 7 wherein said aqueous nitric acid feed solution is adjusted to approximately 0.15–0.5 normal in nitric acid and 0.05–0.2 molar in hydroxylamine sulfate, and wherein said sulfuric acid uranium eluant is approximately 0.25 molar in sulfuric acid and approximately 0.05 molar in hydroxylamine sulfate, and wherein said aqueous nitric acid eluant approximates 4–6 molar in nitric acid and 0.2–0.3 molar in sulfamic acid.

9. The method of claim 8, wherein the adjusted nitric acid feed solution is contacted with the resin at a flow rate of approximately 5–15 ml./min./cm.$^2$, the adsorbed uranium is eluted from said resin bed at a flow rate up to approximately 5 ml./min./cm.$^2$, and said plutonium is eluted from said resin bed at a flow rate up to approximately 2 ml./min./cm.$^2$.

10. The method of claim 9, wherein said plutonium is eluted from said resin bed in a flow direction opposite to the flow directions of said adjusted nitric acid feed solution and said sulfuric acid uranium eluant.

11. A process for concentrating plutonium from an aqueous nitric acid solution containing same in concentration substantially less than 40 grams plutonium per liter, together with uranium and fission products, which comprises adjusting said solution to approximately 0.3 molar in nitric acid and 0.05 molar in hydroxylamine sulfate, passing the resulting adjusted feed solution through a bed of a comminuted organic cation exchange resin characterized by a plurality nuclear sulfonic acid groups at a flow rate of approximately 15 milliliters/min./cm.$^2$, selectively eluting the resulting adsorbed uranium from said bed, while maintaining said plutonium $Pu^{+3}$ oxidation state, with an aqueous solution approximately 0.25 molar in sulfuric acid and approximately 0.05 molar in hydroxylamine sulfate at a flow rate of approximately 2 ml./min./cm.$^2$, and thereafter, while still maintaining said plutonium in $Pu^{+3}$ oxidation state, eluting the same with an aqueous solution approximately 6 normal in nitric acid and 0.3 molar in sulfamic acid at a flow rate of approximately 0.2 ml./min./cm.$^2$ in a flow direction opposite to the flow directions of said adjusted nitric acid feed solution and said sulfuric acid uranium eluant.

No references cited.